United States Patent [19]

Kansupada

[11] Patent Number: 5,058,648

[45] Date of Patent: Oct. 22, 1991

[54] COATING COMPOSITION AND TIRE COATED THEREWITH

[75] Inventor: Bharat K. Kansupada, Mogadore, Ohio

[73] Assignee: The Goodyear Tire & Rubber Company, Akron, Ohio

[21] Appl. No.: 489,115

[22] Filed: Mar. 5, 1990

[51] Int. Cl.$^5$ .............................................. B60C 13/00
[52] U.S. Cl. ................................ 152/524; 152/525; 156/116; 252/589
[58] Field of Search ............... 152/524, 575, DIG. 12; 156/116; 252/588, 589; 427/155; 250/461.1, 372, 271

[56] References Cited

U.S. PATENT DOCUMENTS

| | | | |
|---|---|---|---|
| 2,031,674 | 2/1936 | Schneider et al. | 427/155 |
| 3,114,650 | 12/1963 | Oppenheim et al. | 152/524 |
| 3,169,186 | 2/1965 | Howard | 250/271 |
| 3,607,498 | 10/1971 | Kubota | 152/524 |
| 3,928,373 | 12/1975 | Beck et al. | 252/589 |
| 4,922,113 | 5/1990 | Melancon | 250/461.1 |

FOREIGN PATENT DOCUMENTS 56-93027  7/1981  Japan ..................... 250/372

Primary Examiner—Michael W. Ball
Assistant Examiner—Daniel J. Stemmer
Attorney, Agent, or Firm—Henry C. Young, Jr.

[57] ABSTRACT

A composition comprised of polyvinylalcohol coating containing at least one water soluble ultraviolet absorber. In one aspect, there is provided a rubber tire having at least one surface coated with such composition.

5 Claims, No Drawings

COATING COMPOSITION AND TIRE COATED THEREWITH

FIELD

This invention relates to a coating composition for a cured rubber substrate and to such a coated cured rubber substrate. More specifically, the invention relates to a protective coating composition for a cured rubber tire sidewall and a tire with a sidewall having such coating thereon.

BACKGROUND

Tire sidewalls are often coated with protective paints or coatings, particularly tire sidewalls having a color which contrasts with the typical black colored remainder of the tire. The general purpose of such a protective coat or painting is to inhibit or prevent migration of chemicals to the tire rubber composition from the surface of an adjacent black colored tire which would otherwise tend to stain and thus, discolor the rubber. The staining usually becomes evident after exposure of the contacted rubber surface to ultra-violet light such as sunlight. Such contact staining phenomenon is well known.

A water soluble polyvinylalcohol (PVA) based coating is often used for such protective coating for tire sidewalls, particularly white tire sidewalls.

White sidewall pneumatic rubber tires are sometimes mounted, aligned and balanced on metal rims on an automated basis which involves detection of a highly ultraviolet reflective (fluorescent) label placed on the coated tire white sidewall. Unfortunately, a PVA based coating on the white sidewall, which also overcoats the label, can also be highly reflective and thus, interfere with the label detection and associated mounting, alignment and balancing of the tire on the rim.

The label detector apparently becomes confused and does not effectively discern an adequate differentiation between the label and the PVA coating.

Thus, in one aspect, it is desired to provide a tire sidewall, particularly a pneumatic rubber tire white sidewall, having a PVA-based coating thereon which does not substantially interfere with detection of an ultraviolet reflective label on said tire surface while maintaining a stain resistant quality.

Rubber tires are typically black in color due to the carbon black reinforcement contained therein. If a contrasting or other color is desired for a part of the tire, then a coloring pigment is used rather than the carbon black. Conventionally, various of the compounding ingredients used in the formulation of rubber for the manufacture of rubber products such as tires are of the staining type, namely, amine based antidegradants and aromatic rubber processing oils. The materials tend to migrate to the surface of the rubber and may stain or discolor a rubber surface of another rubber article which may come in contact with it for a period of time, the discoloration typically becoming evident after the contacted rubber is then exposed to ultra-violet light.

Thus, often, a polyvinylalcohol (PVA) based coating is used to protect such contrastingly colored rubber surfaces from other rubber surfaces of the staining type because the polyvinylalcohol itself tends to be a barrier for the migration of such staining material. Moreover, the PVA can normally be easily removed from the coated rubber surface, when and if desired, by simple water washing, usually with a soap solution, since the PVA itself normally has a relatively high degree of water solubility. Thus, the PVA coat has a primary use for storage and shipping of the tires. It may easily be removed by the user by water washing. The general use of PVA for such purpose is well known.

PVA is normally used for such purpose in conjunction with (mixed with) a plasticizer therefor, including at least one of polyglycerol, diglycerol and glycerin, so that the resulting PVA-based coating has a degree of flexibility. Such PVA mixture is referred to herein as PVA coating and can have a relatively high degree of reflectivity.

Accordingly, it is desired to provide a coating composition and a resultant coated rubber product, particularly a coated tire sidewall rubber surface, which will retard, inhibit and/or prevent the migration of amine based antidegradants and aromatic processing oils onto the rubber sidewall surface, such as a white sidewall, from an adjacent and contacting black rubber surface, yet still enable a detection of an ultraviolet reflective label on the surface of the tire and maintaining a stain resistant quality of the PVA-based coating.

DISCLOSURE AND PRACTICE OF THE INVENTION

In accordance with this invention, a composition is comprised of (A) 100 parts by weight polyvinylalcohol (PVA) coating comprised of about 70 to about 90 percent PVA and, correspondingly, about 10 to about 30 percent of at least one of polyglycerol, diglycerol and glycerin plasticizer therefor, and (B) about 2.5 to about 10, preferably about 2.5 to about 5, parts by weight of at least one water soluble ultraviolet light absorbant composition.

While it is contemplated various water soluble ultraviolet light absorbant compositions can be used, a preferred ultraviolet light absorbant is understood to be the reaction product of beta-(3-(2H-benzotriazole-2-yl)-4-hydroxy-5-tert-butylphenyl)propronic acid, methyl ester thereof and polyethylene glycol. Preferably, the polyethylene glycol has a molecular weight in the range of about 200 to about 400. Representative of such products are at least one of poly(oxy-1,2-ethanediyl)alpha(3-(3-(2H-benzotriazole-2-yl)-5-(1,1-dimethylethyl)-4-hydroxypheny,-1oxopropyl)-omega-hydroxy- and poly-(oxy-1,2ethanediyl), alpha-(3-(2H-benzotriazol-2-yl)-5-(1,1-dimethylethyl)-b 4-hydroxyphenyl)-1-oxopropyl)-omega(3-(3-(2H- benzotriazol-2-yl)-5-(1,1-dimethylethyl)-4-hydroxyphenyl)-1-oxopropoxy)-.

It is an important aspect of this invention that the ultraviolet light absorber is water soluble so that it is uniformly distributed in the coating. It is also important that it does not have an adverse effect on the staining protection of the PVA coating. It is, thus, intended to exclude dispersions of ultraviolet light absorbers.

In the practice of this invention, it is understood that the PVA coating includes a suitable plasticizer therefor, such as glycerin, polyglycerol and/or diglycerol to make the PVA coating more flexible.

Typically the PVA coating is comprised of 100 parts by weight PVA and about 15 to about 25 or even up to about 30 parts by weight plasticizer. Such coating composition is relatively well known to those skilled in such art.

As hereinbefore referenced, various ingredients are conventionally used in the compounding of rubber for the manufacture of rubber articles, including tires, which are well known to those having skill in such art such as the various antidegradants, processing oils and the like.

Ultraviolet absorbant compositions act to absorb ultraviolet light and thus, provide a special benefit by reducing the ultraviolet light reflected from the surface of the PVA based coating on the rubber surface.

Thus, there is a particular benefit in utilizing the coating composition for coating at least a portion of the sidewall of a rubber tire, particularly a pneumatic rubber tire, and has been observed to enable a suitable detection of marking labels designed to reflect ultraviolet light even in the presence of the PVA coating using the water soluble ultraviolet absorber, particularly where said label is placed over the PVA-based coating.

Thus, in accordance with this invention, a rubber tire is provided having at least one surface coated with the composition of this invention, particularly its sidewall portion.

In another aspect, such tire is provided with an ultraviolet reflective label affixed on at least one surface for which the composition of this invention also overcoats the said label.

In further accordance with this invention, a pneumatic tire is provided composed of cured rubber of which a portion of said cured rubber contains at least one pigment loading selected from particulate titanium dioxide and zinc oxide in the absence of carbon black wherein said portion has a coating of the composition of this invention thereon.

In another aspect, such tire has an ultraviolet light reflective label affixed to at least one of its surfaces which has been coated with the composition of this invention.

The polyvinylalcohol can generally be described as being about an 80 to 99.5 percent hydrolyzed polyvinylacetate. Thus the PVA, as it would be understood by those having skill in the art, contains a small amount of polyvinyl acetate. It usually has a number average molecular weight in the range of about 22,000 to about 50,000 and a molecular weight average in the range of about 84,000 to about 110,000, although these values are not considered critical but are desirable. Those having skill in such art recognize such description of a PVA.

The advantages of this invention are more particularly shown by the following example in which the parts and percentages are by weight unless otherwise indicated.

EXAMPLE I

Sulfur cured rubber samples are obtained having the dimensions of about 2 inches by 2 inches with a thickness of about ⅛ inch.

Water based coating compositions are prepared of polyvinylalcohol coating material (Control Coating A) and as a mixture of polyvinylalcohol coating material and water soluble ultraviolet light absorber (Experimental Coating B).

The water based coating compositions (A and B) are individually and separately coated onto the white cured rubber samples and are allowed to dry in a circulating hot air oven at a temperature of about 120° to 140° C. for about 15 minutes.

For illustrative purposes, a coating composition for this invention is shown in Table 1 and is referred to herein as Control (A): (B) as the experimental, are described in the following Table 1.

The water soluble ultraviolet absorber is added to the composition in an amount of 0.65 parts (3.8 parts based on the PVA plus plasticizer) and identified herein as Experimental (B).

TABLE 1

| Material | Parts |
| --- | --- |
| Water | 81 |
| PVA | 14 |
| Polyglycerol/diglycerol | 0.3 |
| Glycerin | 2.8 |
| Surfactant | 0.1 |
| Biocide | 0.1 |
| Blue Pigment | 1.0 |
| Defoamer | 0.1 |
| | 100.00 |

The ultraviolet absorber is reported as poly(oxy-1,2-ethanediyl)alpha(3-(3-(2H-benzotriazol-2-yl)-5-(1,1-dimethylethyl)-4-hydroxyphenyl-1-oxopropyl)-omega-hydroxy- and obtainable as TINUVIN 1130 from Ciba Geigy Corporation.

The reflectivity of the coated samples is measured by a suitable reflected light sensor, particularly of ultraviolet light, with results shown in Table 2.

TABLE 2

| Sample | Reflectance Value |
| --- | --- |
| Control (A) | 88 |
| Exp (B) | 5 |

Thus, the coating of Experimental Sample B substantially reduces the light reflectance and it is considered sufficient to enable an effective differentiation by a reflective light detector between the PVA-based coating of Exp. (B) and an ultraviolet reflective label on the surface of a cured rubber tire which was first coated with the PVA-based coating.

What is claimed is:

1. A rubber tire having at least one surface coated with a composition comprised of (A) 100 parts by weight polyvinylalcohol (PVA) coating comprised of about 70 to about 90 percent PVA and, correspondingly, about 10 to about 30 percent of at least one of polyglycerol, diglycerol and glycerin plasticizer therefor; and (B) about 2.5 to about 10 parts by weight of at least one water soluble ultraviolet absorber selected from at least one of (i) a reaction product of beta-(3(2H-benzotriazol-2-yl)-4-hydroxy-5-tert-butylphenyl)-propionic acid, methylester thereof and polyethyleneglycol having a molecular weight in the range of about 200 to about 400, (ii) poly(oxy-1,2-ethanediyl) alpha(3-(3-(2H-benzotriazol-2-yl)-5-(1,1-dimethylethyl)-4-hydroxyphenyl-1-oxopropyl)-omega-hydroxy and (iii) poly (oxy-1,2-ethanediyl), alpha-3-(3-(2H-benzotriazole-2-yl)-5-(1,1-dimethylethyl)-4-hydroxyphenyl)-1-oxopropyl)-omega-(3-(3-(2H-benzo-triazol-2-yl)-5-(1,1-dimethylethyl)-4-hydroxyphenyl)-1-oxopropoxy) and having an ultraviolet light reflective label affixed on said coated surface.

2. The rubber tire of claim 1 having at least one surface coated with said composition which contains about 2.5 to about 5 parts by weight of water soluble ultraviolet absorber (ii).

3. The pneumatic tire of claim 1 composed of cured rubber of which a portion of said cured rubber contains at least one pigment loading selected from particulate titanium dioxide and zinc oxide in the absence of carbon black wherein portion has a coating thereon of said composition.

4. The pneumatic tire of claim 2 composed of cured rubber of which a portion of said cured rubber contains at least one pigment loading selected from particulate titanium dioxide and zinc oxide in the absence of carbon black wherein portion has a coating thereon said composition.

5. The tire of claim 1 where said water soluble ultraviolet absorber is poly(oxy-1,2-ethanediyl) alpha(3-(3-(2H-benzotriazol-2-yl)-5-(1,1-dimethyl ethyl)-4-hydroxyphenyl-1-oxopropyl)-omega-hydroxy-.

* * * * *